(12) United States Patent
MacBain (10) Patent No.: US 6,775,601 B2
(45) Date of Patent: Aug. 10, 2004

(54) METHOD AND CONTROL SYSTEM FOR CONTROLLING PROPULSION IN A HYBRID VEHICLE

(75) Inventor: John A. MacBain, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/214,048

(22) Filed: Aug. 6, 2002

(65) Prior Publication Data

US 2004/0030469 A1 Feb. 12, 2004

(51) Int. Cl.$^7$ ................................................. G06F 7/00
(52) U.S. Cl. ........................ 701/22; 180/65.1; 180/65.3
(58) Field of Search .......................... 701/22; 180/65.1, 180/65.2, 65.3, 65.4, 65.8, 69.6

(56) References Cited

U.S. PATENT DOCUMENTS

| | | | |
|---|---|---|---|
| 6,170,587 B1 * | 1/2001 | Bullock | 180/69.6 |
| 6,186,253 B1 * | 2/2001 | Barnhart et al. | 180/65.2 |
| 6,321,145 B1 | 11/2001 | Rajashekara | |
| 6,494,277 B1 * | 12/2002 | Boggs et al. | 180/65.2 |
| 6,512,967 B2 * | 1/2003 | Ostberg et al. | 701/22 |
| 6,564,129 B2 | 5/2003 | Badenoch | |

OTHER PUBLICATIONS

Proceedings of the IEEE, vol. 89, No. 12, Dec. 2001, Special Issue 2001: An Energy Odyssey! articled entitled Fuel Cell Systems: Efficient, Flexible Energy Conversion for the 21$^{st}$ Centery by Michael W. Ellis, Michael R. Von Spakovsky, and Douglas J. Nelson.

Proceedings of the IEEE, vol. 89, No. 12, Dec. 2001, Special Issue 2001: An Energy Odyssey! articled entitled Fuel Cells—The Clean and Efficient Power Generators by Mohammad Farooque and Hans C. Maru.

Proceedings of the IEEE, vol. 90, No. 2, Feb. 2002, The State of The Art Of Electric & Hybrid Vehicles articles entitled The State of the Art of Electric and Hybrid Vehicles by C.C. Chan, Fellow, IEEE.

* cited by examiner

*Primary Examiner*—Gertrude A. Jeanglaude
(74) *Attorney, Agent, or Firm*—Jimmy L. Funke (57) ABSTRACT

Method and control system for controlling propulsion equipment in a hybrid vehicle including a traction motor and a propulsion unit, such as an internal combustion engine or a fuel cell, are provided. In one implementation, the control system includes a sensor coupled to sense a signal indicative of vehicle torque demand. The control system further includes memory for storing a threshold torque range indicative of conditions of relatively low vehicle torque demand. A processor is configured to process the signal indicative of vehicle torque demand to determine whether the vehicle torque demand is within the threshold torque range. During conditions when the signal indicative of vehicle torque demand is within the threshold torque range, an actuator is configured to generate a signal configured to activate the electric traction motor to drivingly propel the vehicle while de-engaging the internal combustion engine from propelling the vehicle. During conditions when the signal indicative of vehicle torque demand is outside the threshold torque range, the actuator is configured to generate a signal configured to deactivate the electric traction motor from drivingly propelling the vehicle while re-engaging the internal combustion engine to propel the vehicle.

17 Claims, 2 Drawing Sheets

METHOD AND CONTROL SYSTEM FOR CONTROLLING PROPULSION IN A HYBRID VEHICLE

BACKGROUND OF THE INVENTION

The present invention is generally directed to techniques and system for controlling propulsion, and, more particularly, to control system and method for controlling a propulsion system in a hybrid vehicle.

There are some known control strategies regarding use of electric traction in hybrid vehicles. Typically, these strategies apply to hybrids where the internal combustion engine (ICE) may not be fully capable in the sense that normal drive cycles cannot be performed with the ICE alone. One common known strategy is based on providing electrical traction assist as a boost to the ICE when required or to provide an electric start or launch, thus eliminating the need of rapidly starting the ICE to start the vehicle from a "stop" condition.

In some hybrid applications, the internal combustion engine may be designed to provide full driving capacity over the normal drive cycles encountered by a given vehicle. That is, the ICE is sufficiently robust to meet the driving needs of the vehicle all by itself. However, in these applications, if one adds an electric traction motor onboard the vehicle, the additional tractive effort derived from the traction motor is generally used to add more capability to the vehicle, e.g., provide a sportier vehicle from an acceleration capability point of view. Unfortunately, this type of propulsion strategy is not necessarily conducive to improving the fuel economy of the vehicle since the traction motor is not used in any systematic manner to propel the vehicle during periods of low efficiency in the ICE. As suggested above, the traction motor for such known hybrid applications is generally used during periods of high efficiency of the ICE. Therefore, although improved acceleration may be gained in such hybrid applications, fuel consumption is usually sacrificed.

An automotive ICE is typically at its lowest efficiency when torque requirements are low. Thus, to achieve greater fuel economy, it would be desirable to stop fueling the ICE when the torque requirements are low and utilize during such periods an electric machine (e.g., a traction motor) to propel the vehicle. Conversely, the ICE may be re-engaged when the torque requirements are high (and the resulting efficiency of the ICE may be relatively high) and in this case, the electric machine may be used as an alternator to charge the electric power sources onboard the hybrid vehicle.

BRIEF SUMMARY OF THE INVENTION

Generally, the present invention fulfills the foregoing needs by providing in one aspect thereof a method for controlling a propulsion system in a hybrid vehicle including a traction motor and an internal combustion engine. The method allows sensing a signal indicative of vehicle torque demand. The method further allows selecting a threshold torque range indicative of conditions of relatively low vehicle torque demand. The signal indicative of vehicle torque demand is processed to determine whether the vehicle torque demand is within the threshold torque range. During conditions when the signal indicative of vehicle torque demand is within the threshold torque range, a signal is generated to activate the electric traction motor to drivingly propel the vehicle while de-engaging the internal combustion engine from propelling the vehicle. During conditions when the signal indicative of vehicle torque demand is outside the threshold torque range, a signal is generated to deactivate the electric traction motor from drivingly propelling the vehicle while re-engaging the internal combustion engine to propel the vehicle.

The present invention further fulfills the foregoing needs by providing in another aspect thereof, a control system for controlling propulsion equipment in a hybrid vehicle including a traction motor and an internal combustion engine. The control system includes a sensor coupled to sense a signal indicative of vehicle torque demand. The control system further includes memory for storing a threshold torque range indicative of conditions of relatively low vehicle torque demand. A processor is configured to process the signal indicative of vehicle torque demand to determine whether the vehicle torque demand is within the threshold torque range. During conditions when the signal indicative of vehicle torque demand is within the threshold torque range, an actuator is configured to generate a signal configured to activate the electric traction motor to drivingly propel the vehicle while de-engaging the internal combustion engine from propelling the vehicle. During conditions when the signal indicative of vehicle torque demand is outside the threshold torque range, the actuator is configured to generate a signal configured to deactivate the electric traction motor from drivingly propelling the vehicle while re-engaging the internal combustion engine to propel the vehicle.

In yet another aspect of the invention, a method is provided for controlling a propulsion system in a hybrid vehicle that includes a traction motor and a propulsion unit, such as an internal combustion engine, or a fuel cell. The method allows mapping respective regions of relatively high and low efficiency in an efficiency map for the propulsion unit. The method further allows sensing a signal indicative of said regions of relatively high and low efficiency. During conditions when the sensed signal indicates a region of low-efficiency for the propulsion unit, generating a signal configured to activate the electric traction motor to drivingly propel the vehicle while de-engaging the propulsion unit from propelling the vehicle. During conditions when the sensed signal indicates a region of high-efficiency for the propulsion unit, generating a signal configured to deactivate the electric traction motor from drivingly propelling the vehicle while re-engaging the propulsion unit to propel the vehicle.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Overview

If one had available an engine efficiency map, one would be able to observe distinct regions of engine efficiency during operation of an internal combustion engine, e.g., a gasoline engine, or Diesel engine, or any other possible fossil fuel engine. As will be recognized by those skilled in the art, the concepts below could also apply if the main propulsion unit or engine were a fuel cell or other type of non-electrically powered engine. In the fuel cell application, as will be readily understood by those skilled in the art, the regions of high and low efficiency would be configured to correspond to those of a fuel cell power plant. For readers who desire further background regarding fuel cell technology, reference is made to the following two articles published in Proceedings of the IEEE, Volume 89, Number 12, December 2001, Special Issue 2001: An Energy Odyssey! Article entitled "Fuel Cell Systems: Efficient, Flexible Energy Conversion for the $21^{st}$ Century by Michael W. Ellis, Michael R. Von Spakovsky and Douglas J. Nelson; and article entitled "Fuel Cells—The Clean and Efficient Power Generators by Mohammad Farooque and Hans C. Maru, which are herein incorporated by reference. Thus, although the description below generally refers to an internal combustion engine, it will be appreciated that an internal combustion engine represents one illustration of a propulsion unit that may be used in combination with a traction motor.

For example, in the case of a gasoline engine, during start-up of the vehicle from a stop condition, even though the engine may consume a large amount of fuel to accelerate the vehicle, the engine efficiency is relatively high compared to other operating regions of the engine. That is, one would use a lot of energy during that period of high acceleration. However, the engine would be operating in a region of relatively high efficiency for each unit of fuel that it uses. The present inventor has innovatively recognized that it would be advantageous to use the electric motor not just to augment the power capabilities of the vehicle, but to use the electric motor during states or modes of vehicle operation that otherwise would have been commonly propelled by the ICE, regardless of whether the ICE would not have been operating very efficiently. One basic premise of aspects of this invention is to use the traction motor during periods that would otherwise have resulted in operation of the ICE in regions of low efficiency. For example, when one is cruising down the highway, the ICE may consume relatively small amounts of fuel relative to the amount of fuel used during start up. However, the ICE during highway travel may be operating at the very low end of its torque or power production capabilities, and on most gasoline engines that would mean that such engines would not be at the most efficient operating point. Even though, during such periods of highway travel, the ICE is providing relatively high miles per gallon, that ICE might only be providing a fraction of the efficiency that such engine may deliver during periods of high acceleration. Thus, opposite to known control techniques for hybrid applications, one would want to use the electric traction motor to propel the vehicle when the torque or power requirements are low, such as during cruising. Conversely, when the ICE is operating in a relatively efficient mode of operation, one would want to recharge the power sources, e.g., batteries, ultracapacitors or any other power sources that power the traction motor. Thus, techniques embodying aspects of the present invention essentially turn around the control strategy of when one uses the electric motor in order to provide superior fuel economy. In one exemplary embodiment, it is contemplated that such techniques may be applicable to a parallel-hybrid, and, more particularly, to mild-parallel-hybrids, such as an Energen-10 hybrid (Integrated Starter Generator or BAS hybrids), where the ICE is fully capable. For a robust-parallel-hybrid application, some launch assist may be necessary if the ICE is relatively weak. However, the concept of using electric traction during periods of low torque requirement would still provide an excellent opportunity for fuel savings. As used herein, a parallel-hybrid generally comprises a vehicular propulsion system in which tractive power may be selected from either of at least two distinct power sources, typically, an ICE and an electric motor. A mild-parallel-hybrid generally comprises a vehicular propulsion system where the amount of tractive power from the electric traction motor may be relatively low in comparison to the ICE. A robust-parallel-hybrid is one where the electric motor can provide a significant amount of tractive power relative to the ICE. For readers who desire further background regarding hybrid technology for vehicular applications, reference is made to article published in Proceedings of the IEEE, Volume 90, Number 2, February 2002, The State of the Art of Electric & Hybrid Vehicles entitled "The State of the Art of Electric And Hybrid Vehicles by C. C. Chan, Fellow, IEEE, which is herein incorporated by reference.

Figure 1:
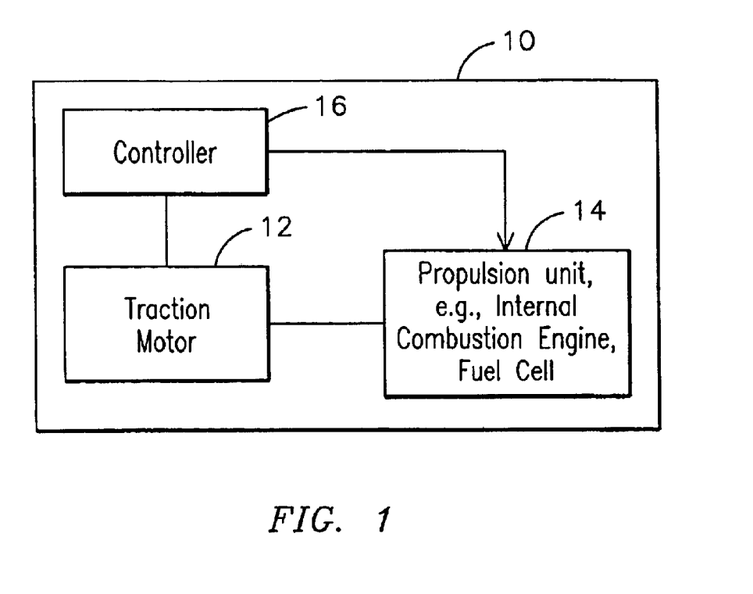
FIG. 1 is a block diagram representation of an exemplary control system embodying aspects of the present invention and including a controller for controlling propulsion equipment in a hybrid vehicle with a traction motor and a propulsion unit.
Figure 2:
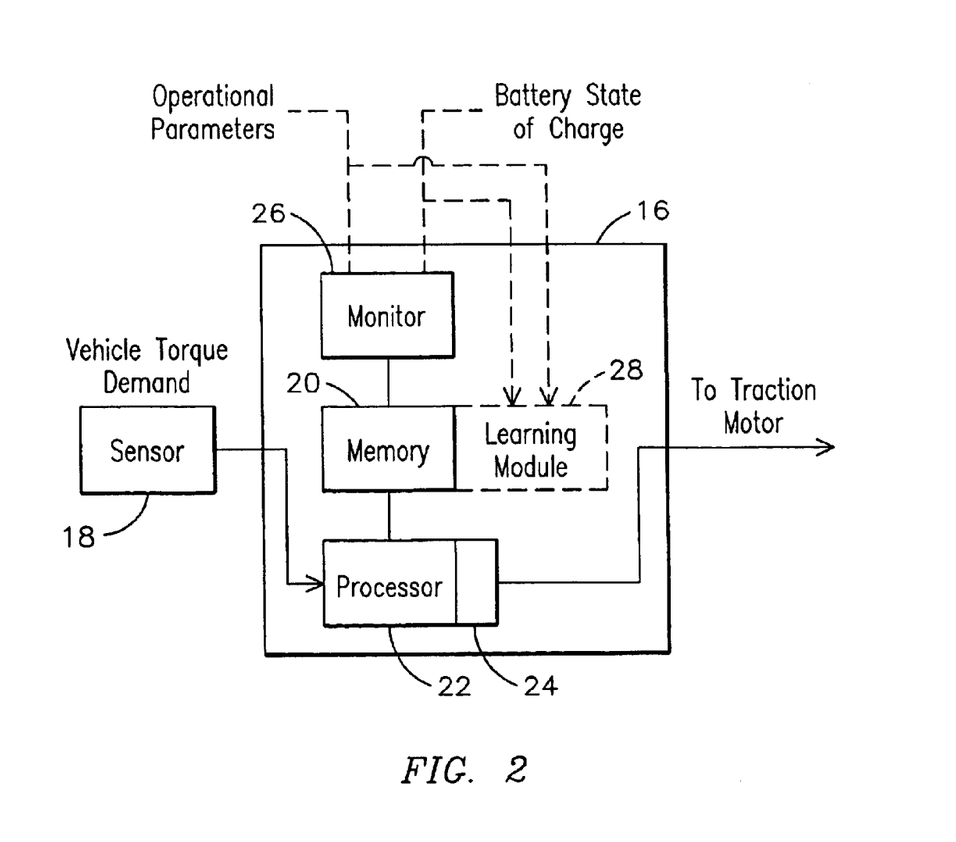
FIG. 2 is a block diagram representation of an exemplary embodiment for the controller of FIG. 1.

FIG. 1 shows a block diagram of a control system 10 for controlling propulsion equipment in a hybrid vehicle including a traction motor 12 and a propulsion unit 14, such as an internal combustion engine (ICE), fuel cell or both. System 10 further includes a controller 16 for controlling operation of traction motor 12 and propulsion unit 14, based on vehicle torque demand or any other signal that may indicate regions of relatively high and low efficiency of the propulsion unit so that electric tractive effort is provided during periods that otherwise would have resulted in low efficiency operation of the propulsion unit. For readers who desire background information regarding innovative propulsion systems and techniques having a relatively wide speed range, high torque per ampere, high efficiency, quick dynamic response, and operational robustness and reliability under tough environmental or operational conditions, reference is made to U.S. Pat. Nos. 6.577,097 titled "Method and System for Controlling a Synchronous Machine Using a Changeable Cycle-conduction Angle: and 6,590,361 titled "Method and System for Controlling an Induction Machine, commonly assigned to the assignee of the present invention, and herein incorporated by reference. As shown in FIG. 2, a sensor 18 is coupled to sense a signal indicative of vehicle torque demand. For example, such sensor may be coupled to the accelerator pedal to detect whether the accelerator pedal is fully depressed. In this situation, one would not want to be in an electric traction mode. However, if the accelerator is just partially depressed that would indicate a mode of small torque demand and one would want to switch over to the electric traction mode. A memory 20 may be used for storing a threshold torque range indicative of conditions of relatively low vehicle torque demand. In one exemplary embodiment based on simulation results for a given type of vehicles, the range extends from a lower limit indicative of any non-negative torque demand to an upper limit of about 50 Nm. A processor 22 is configured to process the signal indicative of vehicle torque demand to determine whether the vehicle torque demand is within the threshold torque range. During conditions when the signal indicative of vehicle torque demand is within the threshold torque range, an actuator 24 is configured to generate a signal for activating the electric traction motor to propel the vehicle while de-engaging the internal combustion engine from propelling the vehicle. During conditions when the signal indicative of vehicle torque demand is outside the threshold torque rangeT (i.e., during periods of relatively high torque demand, such as when the value of the torque demand is above 50 Nm), actuator 24 is configured to generate a signal for de-activating the electric traction motor from propelling the vehicle, while reengaging the internal combustion engine to propel the vehicle. During such periods, the ICE may be used to mechanically drive the electric machine as an alternator to recharge the power sources of the vehicle. Controller 16 may optionally include a monitor 26 for monitoring parameters indicative of environmental and/or operational conditions of the propulsion system of the vehicle so that the value of the selected threshold torque range may be adjusted based on the value of such operational parameters and/or conditions. Examples of such operational parameters and/or conditions may include the state of charge of the energy source of the traction motor, ambient temperature, and barometric pressure. Controller 16 may optionally include a learning module 28 for collecting and analyzing historical data indicative of previous propulsion system performance of a given vehicle, so that the value of the threshold torque range may be selected based on the analysis performed by the learning module on such historical data.

Figure 3:
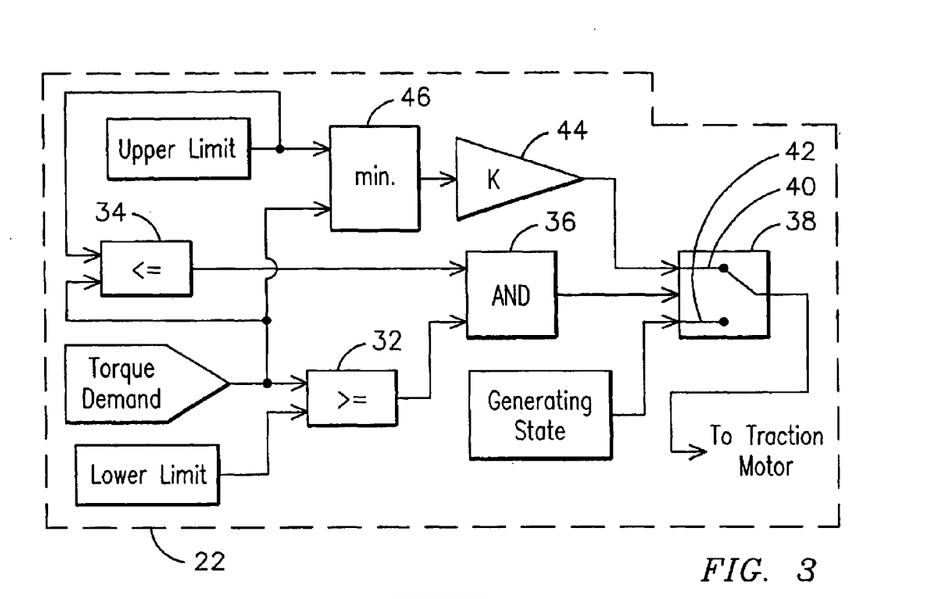
FIG. 3 illustrates in block diagram form a representation of an exemplary processor for the controller of FIG. 2.

FIG. 3 illustrates a block diagram representation of an exemplary processor 22 that may include a first comparator 32 connected to receive the torque demand signal and a lower limit for the threshold torque range, e.g., the lower limit may be chosen to be zero Nm to indicate the presence of a positive torque demand. In operation, the output of comparator 32 has a logic "one" value whenever the torque demand signal has a level that is equal to or greater than the value of the lower limit supplied to comparator 32. A second comparator 34 may be provided to compare the value of the torque demand signal relative to an upper limit for the threshold torque range. As suggested above, in one exemplary embodiment, the upper limit was chosen to be about 50 Nm. In operation, comparator 34 would supply a logic "one" output whenever the torque demand signal is equal or less than the value of the upper limit for the threshold torque range. Block 36 represents a logic "AND" gate that receives the respective outputs from comparators 32 and 34 and is connected to activate a control switch 38 to switchingly connect to either a first switch terminal 40 or a second switch terminal 42 depending on the value of the torque demand signal relative to the threshold torque range. For example, assuming that the value of the vehicle torque demand is positive and less than about 50 Nm, then the electric motor would be commanded to produce the demanded torque in lieu of the ICE. For example, the torque command signal, after suitable signal conditioning through an amplifier 44, and minimum value selector 46, would be passed through switch terminal 40 to suitable motor control circuitry (not shown) to activate the traction motor. Conversely, when the value of the vehicle torque demand signal is either negative or greater than 50 Nm, then the electric machine would be commanded to a generating state through switch terminal 42, and the internal combustion engine would be commanded to propel the vehicle.

As suggested above, a practical implementation would allow for monitoring battery state-of-charge (SOC) and the control strategies described above would be disabled in the event that the SOC of the battery falls below a predefined SOC threshold value.

As suggested above, in one exemplary simulation, the threshold torque range for the torque demand signal extends from about zero Nm up to a value of about 50 Nm. It will be understood however that the threshold torque range could have different values depending on the specific propulsion equipment being utilized or depending on vehicle use location or both. For instance, if someone operates the vehicle in a high altitude location or in a hilly area, the threshold torque range for that vehicle would likely have a different value than for a vehicle operating in flat terrain or in a low-altitude area. As suggested above, it is further contemplated that learning module 28 (FIG. 2), such as a fuzzy logic learning device or a neural network, would process historical data as to how the vehicle is operated and would determine whether, for example, a factory-loaded value for the upper limit of the threshold torque range, e.g., 50 Nm, should be raised or lowered for any given vehicle. Thus, although the threshold torque range may be selected to have a constant value, it will be appreciated that many learning techniques may be used for selecting an optimal value for the threshold torque range based on historical vehicle performance. As suggested above, determining whether a transition to the traction motor should be made may further depend on the health of the battery. Thus, it is contemplated to use an on-board sensor to monitor the state of charge (SOC) of the battery, since the SOC may impact whether or not a transition to the traction motor is made and may further impact the value of the switching threshold. For example, if the battery were at 90% state of charge, the controller would be configured to use the electrically-derived tractive effort during periods of low torque demand. Conversely, if the battery were for example at around 50% of charge or less, it may not be desirable to switch to a power source that may not be able to appropriately power up the propulsion system and, thus, the controller would be configured not to switch to the electric traction mode if the state of charge of the battery is below some predefined state-of-charge threshold. Thus, the controller would be configured to recognize conditions, such as low SOC conditions, that would suggest avoidance of the contribution from the electric machine. For example, the controller may be configured to issue a disable command to the traction motor and provide smooth transitioning to the ICE, in the event the state of charge of the battery becomes to low. That is, during such conditions, the propulsion system would not use electric traction, until the state-of-charge has recovered to above some other predefined threshold value. As suggested above, in some applications, it may desirable to sense environmental parameters, such as altitude, temperature, to determine what should be the most appropriate value for the threshold torque range. As will be appreciated by those skilled in the art, the efficiency map for an engine may be dependent on altitude and/or temperature because air density varies, and oxygen content in the air that fills the cylinder may also vary. Thus, it is contemplated that one could adjust the engine efficiency map as a function of such operational parameters.

In one exemplary embodiment the control algorithm is based on sensing a torque threshold. It will be understood, however, that conceptually, the control algorithm could be much more general. In particular, the goal is to identify the regions of operation of the ICE where the energy efficiency is particularly low. This may differ based on the type of engine and engine speed. As suggested above, the threshold may also be modified as a function of battery state of charge (SOC). Thus, use of a straight forward torque threshold as an indication of ICE energy efficiency should be construed just as one example of a control algorithm, since it is contemplated that in practice actual hardware and software implementation may well be more complex to accomplish the same end goal—namely, utilizing the electric traction motor at time when the ICE is experiencing (or would be experiencing) particularly low energy efficiency.

Figure 4:
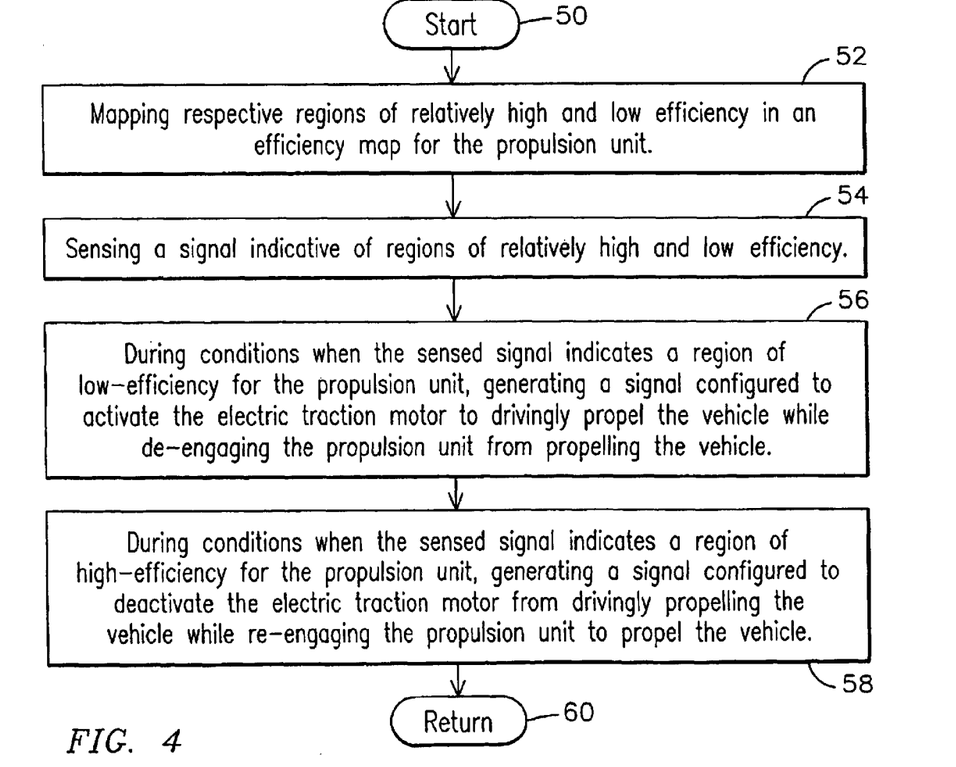
FIG. 4 is a flow chart depicting exemplary actions in connection with a method for controlling a propulsion system in a hybrid vehicle including a traction motor and a propulsion unit, such as an internal combustion engine or a fuel cell.

FIG. 4 is a flow chart depicting exemplary actions in connection with a method for controlling a propulsion system in a hybrid vehicle including a traction motor and a propulsion unit, such as an internal combustion engine or a fuel cell. Subsequent to starting action 50, block 52 allows mapping respective regions of relatively high and low efficiency in an efficiency map for the propulsion unit. Block 54 allows sensing a signal indicative of the regions of relatively high and low efficiency during operation of the propulsion unit. During conditions when the sensed signal indicates a region of low-efficiency for the propulsion unit, block 56 allows generating a signal configured to activate the electric traction motor to drivingly propel the vehicle while de-engaging the propulsion unit from propelling the vehicle. Prior to return action 60, during conditions when the sensed signal indicates a region of high-efficiency for the propulsion unit, block 58 allows generating a signal configured to deactivate the electric traction motor from drivingly propelling the vehicle while re-engaging the propulsion unit to propel the vehicle.

Table 1 below list simulated results for a Land Rover L315 vehicle, illustrating the impact in connection with fuel savings of a strategy embodying aspects of the present invention versus traditional launch assist. In each case typical drive cycles were used in the simulation.

TABLE 1

| Driveline | Propulsion control embodying aspects of the present invention | Traditional launch assist |
|---|---|---|
| Diesel 2l-auto | 7.5% | 3.8% |
| Petrol 2l-manual | 5.8% | 3.4% |
| Petrol 3l-auto | 19.5% | 0.0% |

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, flash memories or any other computer-readable storage medium, wherein, when the computer program code (e.g., segment code) is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a propulsion system in a hybrid vehicle including a traction motor and an internal combustion engine, the method comprising:

sensing a signal indicative of vehicle torque demand;

selecting a threshold torque range indicative of conditions of relatively low vehicle torque demand;

processing the signal indicative of vehicle torque demand to determine whether the vehicle torque demand is within the threshold torque range;

during conditions when the signal indicative of vehicle torque demand is within the threshold torque range, generating a signal configured to activate the electric traction motor to drivingly propel the vehicle while de-engaging the internal combustion engine from propelling the vehicle; and during conditions when the signal indicative of vehicle torque demand is outside the threshold torque range, generating a signal configured to deactivate the electric traction motor from drivingly propelling the vehicle while re-engaging the internal combustion engine to propel the vehicle.

2. The method of claim 1 further comprising monitoring at least one operational parameter indicative of environmental and/or operational conditions of the propulsion system of the vehicle, wherein the value of the selected threshold torque range is adjusted based on the value of the at least one operational parameter.

3. The method of claim 2 wherein the operational parameter is selected from the group comprising state of charge of an energy source of the traction motor, ambient temperature, and barometric pressure.

4. The method of claim 1 wherein a state of charge of an energy source of the traction motor is further determinative of whether the electric traction motor is activated to drivingly propel the vehicle.

5. The method of claim 1 wherein the value of the threshold torque range indicative of conditions of relatively low vehicle torque demand is selected based on historical data indicative of historical propulsion system performance of a given vehicle.

6. The method of claim 1 wherein the hybrid comprises a parallel-hybrid.

7. The method of claim 6 wherein the parallel-hybrid is selected from the group comprising a mild-parallel-hybrid and a robust-parallel-hybrid.

8. A control system for controlling propulsion equipment in a hybrid vehicle including a traction motor and an internal combustion engine, the control system comprising:

a sensor coupled to sense a signal indicative of vehicle torque demand;

memory for storing a threshold torque range indicative of conditions of relatively low vehicle torque demand;

a processor configured to process the signal indicative of vehicle torque demand to determine whether the vehicle torque demand is within the threshold torque range;

during conditions when the signal indicative of vehicle torque demand is within the threshold torque range, an actuator configured to generate a signal configured to activate the electric traction motor to drivingly propel the vehicle while de-engaging the internal combustion engine from propelling the vehicle; and during conditions when the signal indicative of vehicle torque demand is outside the threshold torque range, the actuator configured to generate a signal configured to deactivate the electric traction motor from drivingly propelling the vehicle while re-engaging the internal combustion engine to propel the vehicle.

9. The control system of claim 8 further comprising a monitor configured to monitor at least one operational parameter indicative of environmental and/or operational conditions of the propulsion system of the vehicle, wherein the value of the selected threshold torque range is adjusted based on the value of the at least one operational parameter.

10. The control system of claim 9 wherein the operational parameter is selected from the group comprising state of charge of an energy source of the traction motor, ambient temperature, and barometric pressure.

11. The control system of claim 8 further including a sensor coupled to sense a state of charge of an energy source of the traction motor, said state of charge being determinative of whether the electric traction motor is activated to drivingly propel the vehicle.

12. The control system of claim 8 further including memory for collecting historical data indicative of previous propulsion system performance of a given vehicle, and wherein the value of the threshold torque range is selected based on said historical data.

13. The control system of claim 8 wherein the hybrid comprises a parallel-hybrid.

14. The control system of claim 13 wherein the parallel-hybrid is selected from the group comprising a mild-parallel-hybrid and a robust-parallel-hybrid.

15. A method for controlling a propulsion system in a hybrid vehicle including a traction motor and a propulsion unit, the method comprising:

mapping respective regions of relatively high and low efficiency in an efficiency map for the propulsion unit;

sensing a signal indicative of said regions of relatively high and low efficiency;

during conditions when the sensed signal indicates a region of low-efficiency for the propulsion unit, generating a signal configured to activate the electric traction motor to drivingly propel the vehicle while de-engaging the propulsion unit from propelling the vehicle; and during conditions when the sensed signal indicates a region of high-efficiency for the propulsion unit, generating a signal configured to deactivate the electric traction motor from drivingly propelling the vehicle while re-engaging the propulsion unit to propel the vehicle.

16. The control system of claim 15 wherein the propulsion unit is selected from the group consisting of an internal combustion engine, and a fuel cell.

17. A computer-readable medium including computer-readable code for causing a computer to control a propulsion system in a hybrid vehicle including a traction motor and a propulsion unit, the computer-readable medium comprising:

segment code for mapping respective regions of relatively high and low efficiency in an efficiency map for the propulsion unit;

segment code for sensing a signal indicative of said regions of relatively high and low efficiency;

during conditions when the sensed signal indicates a region of low-efficiency for the propulsion unit, segment code for generating a signal configured to activate the electric traction motor to drivingly propel the vehicle while de-engaging the propulsion unit from propelling the vehicle; and during conditions when the sensed signal indicates a region of high-efficiency for the propulsion unit, segment code for generating a signal configured to deactivate the electric traction motor from drivingly propelling the vehicle while re-engaging the propulsion unit to propel the vehicle.

* * * * *

(12) EX PARTE REEXAMINATION CERTIFICATE (10781st)

United States Patent
MacBain (10) Number: US 6,775,601 C1
(45) Certificate Issued: Dec. 23, 2015

(54) METHOD AND CONTROL SYSTEM FOR CONTROLLING PROPULSION IN A HYBRID VEHICLE

(75) Inventor: John A. MacBain, Carmel, IN (US)

(73) Assignee: Signal IP, Inc.

Reexamination Request:
No. 90/013,385, Oct. 27, 2014

Reexamination Certificate for:
Patent No.: 6,775,601
Issued: Aug. 10, 2004
Appl. No.: 10/214,048
Filed: Aug. 6, 2002

(51) Int. Cl.
*G06F 7/00* (2006.01)
*B60L 11/00* (2006.01)
*B60K 6/48* (2007.10)
*B60W 10/08* (2006.01)
*B60W 10/06* (2006.01)
*B60W 10/02* (2006.01)
*B60W 20/00* (2006.01)

(52) U.S. Cl.
CPC ................. *B60K 6/48* (2013.01); *B60W 10/02* (2013.01); *B60W 10/06* (2013.01); *B60W 10/08* (2013.01); *B60W 20/00* (2013.01); *B60L 2240/662* (2013.01); *B60W 2510/244* (2013.01); *B60W 2540/10* (2013.01); *B60W 2550/12* (2013.01); *Y02T 10/6221* (2013.01); *Y02T 10/6286* (2013.01); *Y02T 10/7291* (2013.01); *Y02T 90/16* (2013.01)

(58) Field of Classification Search
USPC ........................................ 70/22; 180/65.1, 65
See application file for complete search history.

(56) References Cited

To view the complete listing of prior art documents cited during the proceeding for Reexamination Control Number 90/013,385, please refer to the USPTO's public Patent Application Information Retrieval (PAIR) system under the Display References tab.

*Primary Examiner* — Robert M Fetsuga (57) ABSTRACT

Method and control system for controlling propulsion equipment in a hybrid vehicle including a traction motor and a propulsion unit, such as an internal combustion engine or a fuel cell, are provided. In one implementation, the control system includes a sensor coupled to sense a signal indicative of vehicle torque demand. The control system further includes memory for storing a threshold torque range indicative of conditions of relatively low vehicle torque demand. A processor is configured to process the signal indicative of vehicle torque demand to determine whether the vehicle torque demand is within the threshold torque range. During conditions when the signal indicative of vehicle torque demand is within the threshold torque range, an actuator is configured to generate a signal configured to activate the electric traction motor to drivingly propel the vehicle while de-engaging the internal combustion engine from propelling the vehicle. During conditions when the signal indicative of vehicle torque demand is outside the threshold torque range, the actuator is configured to generate a signal configured to deactivate the electric traction motor from drivingly propelling the vehicle while re-engaging the internal combustion engine to propel the vehicle.

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8-11, 13, 15 and 17 are cancelled.

New claims 18-48 are added and determined to be patentable.

Claims 1-7, 12, 14 and 16 were not reexamined.

*18. A control system for controlling propulsion equipment in a hybrid vehicle including a traction motor and an internal combustion engine, the control system comprising: a sensor coupled to sense a signal indicative of vehicle torque demand; memory for storing a threshold torque range indicative of conditions of relatively low vehicle torque demand; a processor configured to process the signal indicative of vehicle torque demand to determine whether the vehicle torque demand is within the threshold torque range; during conditions when the signal indicative of vehicle torque demand is within the threshold torque range, an actuator configured to generate a signal configured to activate the electric traction motor to drivingly propel the vehicle while de-engaging the internal combustion engine from propelling the vehicle; and during conditions when the signal indicative of vehicle torque demand is outside the threshold torque range, the actuator configured to generate a signal configured to deactivate the electric traction motor from drivingly propelling the vehicle while re-engaging the internal combustion engine to propel the vehicle, wherein conditions when the signal indicative of vehicle torque demand is within the threshold torque range comprise highway cruising conditions.*

*19. The control system of claim 18, wherein highway cruising conditions comprise periods of operation of the vehicle during which the internal combustion engine consumes fewer amounts of fuel than at start up, yet nevertheless does not operate at its most efficient operating point.*

*20. A method for controlling a propulsion system in a hybrid vehicle including a traction motor and a propulsion unit, the method comprising: mapping respective regions of relatively high and low efficiency in an efficiency map for the propulsion unit; sensing a signal indicative of said regions of relatively high and low efficiency; during conditions when the sensed signal indicates a region of low-efficiency for the propulsion unit, generating a signal configured to activate the electric traction motor to drivingly propel the vehicle while de-engaging the propulsion unit from propelling the vehicle; and during conditions when the sensed signal indicates a region of high-efficiency for the propulsion unit, generating a signal configured to deactivate the electric traction motor from drivingly propelling the vehicle while re-engaging the propulsion unit to propel the vehicle, wherein conditions of relatively low efficiency comprise highway cruising conditions.*

*21. The method of claim 20, wherein highway cruising conditions comprise periods of operation of the vehicle during which the internal combustion engine consumes fewer amounts of fuel than at start up, yet nevertheless does not operate at its most efficient operating point.*

*22. A computer-readable medium including computer-readable code for causing a computer to control a propulsion system in a hybrid vehicle including a traction motor and a propulsion unit, the computer-readable medium comprising: segment code for mapping respective regions of relatively high and low efficiency in an efficiency map for the propulsion unit; segment code for sensing a signal indicative of said regions of relatively high and low efficiency; during conditions when the sensed signal indicates a region of low-efficiency for the propulsion unit, segment code for generating a signal configured to activate the electric traction motor to drivingly propel the vehicle while de-engaging the propulsion unit from propelling the vehicle; and during conditions when the sensed signal indicates a region of high-efficiency for the propulsion unit, segment code for generating a signal configured to deactivate the electric traction motor from drivingly propelling the vehicle while re-engaging the propulsion unit to propel the vehicle, wherein conditions of relatively low efficiency comprise highway cruising conditions.*

*23. The computer-readable medium of claim 22, wherein highway cruising conditions comprise periods of operation of the vehicle during which the internal combustion engine consumes fewer amounts of fuel than at start up, yet nevertheless does not operate at its most efficient operating point.*

*24. A control system for controlling propulsion equipment in a hybrid vehicle including a traction motor and an internal combustion engine, the control system comprising:*

*a sensor coupled to sense a signal indicative of vehicle torque demand;*

*memory for storing a threshold torque range indicative of conditions of relatively low vehicle torque demand, said conditions of relatively low vehicle torque demand comprising highway cruising;*

*a processor configured to process the signal indicative of vehicle torque demand to determine whether the vehicle torque demand is within the threshold torque range;*

*during conditions when the signal indicative of vehicle torque demand is within the threshold torque range, an actuator configured to generate a signal configured to activate the electric traction motor to drivingly propel the vehicle while de-engaging the internal combustion engine from propelling the vehicle; and*

*during conditions when the signal indicative of vehicle torque demand is outside the threshold torque range, the actuator configured to generate a signal configured to deactivate the electric traction motor from drivingly propelling the vehicle while re-engaging the internal combustion engine to propel the vehicle.*

*25. The control system of claim 24 further comprising a monitor configured to monitor at least one operational parameter indicative of environmental and/or operational conditions of the propulsion system of the vehicle, wherein the value of the selected threshold torque range is adjusted based on the value of the at least one operational parameter.*

*26. The control system of claim 25 wherein the operational parameter is selected from the group comprising state of charge of an energy source of the traction motor, ambient temperature, and barometric pressure.*

*27. The control system of claim 24 further including a sensor coupled to sense a state of charge of an energy source of the traction motor, said state of charge being determinative of whether the electric traction motor is activated to drivingly propel the vehicle.*

*28. The control system of claim 24 further including memory for collecting historical data indicative of previous* propulsion system performance of a given vehicle, and wherein the value of the threshold torque range is selected based on said historical data.

29. The control system of claim 24 wherein the hybrid comprises a parallel-hybrid.

30. The control system of claim 29 wherein the parallel-hybrid is selected from the group comprising a mild-parallel-hybrid and a robust-parallel-hybrid.

31. The control system of claim 24, wherein the threshold torque range comprises a lower limit indicative of a non-negative torque demand to an upper limit of approximately 50 Nm.

32. The control system of claim 24, wherein the hybrid vehicle comprises a sport utility vehicle.

33. The control system of claim 32, wherein the sport utility vehicle is a Land Rover vehicle.

34. The control system of claim 24, wherein conditions when the signal indicative of vehicle torque demand is outside the threshold torque range comprise conditions when the vehicle torque demand is greater than approximately 50 Nm.

35. The control system of claim 24, wherein highway cruising comprises periods of operation of the vehicle during which the internal combustion engine consumes fewer amounts of fuel than at start up, yet nevertheless does not operate at its most efficient operating point.

36. A method for controlling a propulsion system in a hybrid vehicle including a traction motor and a propulsion unit, the method comprising:
mapping respective regions of relatively high and low efficiency in an efficiency map for the propulsion unit;
sensing a signal indicative of said regions of relatively high and low efficiency, said conditions of relatively low efficiency including highway cruising conditions;
during conditions when the sensed signal indicates a region of low-efficiency for the propulsion unit, generating a signal configured to activate the electric traction motor to drivingly propel the vehicle while de-engaging the propulsion unit from propelling the vehicle; and
during conditions when the sensed signal indicates a region of high-efficiency for the propulsion unit, generating a signal configured to deactivate the electric traction motor from drivingly propelling the vehicle while re-engaging the propulsion unit to propel the vehicle.

37. The method of claim 36, wherein highway cruising conditions comprise periods of operation of the vehicle during which the internal combustion engine consumes fewer amounts of fuel than at start up, yet nevertheless does not operate at its most efficient operating point.

38. A computer-readable medium including computer-readable code for causing a computer to control a propulsion system in a hybrid vehicle including a traction motor and a propulsion unit, the computer-readable medium comprising:
segment code for mapping respective regions of relatively high and low efficiency in an efficiency map for the propulsion unit, said conditions of relatively low efficiency including highway cruising;
segment code for sensing a signal indicative of said regions of relatively high and low efficiency;
during conditions when the sensed signal indicates a region of low-efficiency for the propulsion unit, segment code for generating a signal configured to activate the electric traction motor to drivingly propel the vehicle while de-engaging the propulsion unit from propelling the vehicle; and
during conditions when the sensed signal indicates a region of high-efficiency for the propulsion unit, segment code for generating a signal configured to deactivate the electric traction motor from drivingly propelling the vehicle while re-engaging the propulsion unit to propel the vehicle.

39. The computer-readable medium of claim 38, wherein highway cruising comprises periods of operation of the vehicle during which the internal combustion engine consumes fewer amounts of fuel than at start up, yet nevertheless does not operate at its most efficient operating point.

40. A control system for controlling propulsion equipment in a hybrid vehicle including a traction motor and an internal combustion engine, the control system comprising:
a sensor coupled to sense a signal indicative of vehicle torque demand;
a memory for storing a threshold torque range indicative of conditions of low vehicle torque demand, said conditions of low torque demand represented by a lower limit of the threshold torque range equal to zero torque and an upper limit of the threshold torque range equal to a factory-loaded upper limit value;
a processor configured to process the signal indicative of vehicle torque demand to determine whether the vehicle torque demand is within the threshold torque range, said processor including:
a first comparator coupled to receive the signal indicative of vehicle torque demand from the sensor and to receive the lower limit for the threshold torque range, said first comparator configured to have an output having a logic "one" value whenever the signal indicative of vehicle torque demand has a level that is equal to or greater than a value of the lower limit supplied to the first comparator;
a second comparator coupled to compare the value of the signal indicative of vehicle torque demand relative to the upper limit for the threshold torque range, said second comparator configured to supply a logic "one" output whenever the signal indicative of vehicle torque demand is equal or less than a value of the upper limit for the threshold torque range; and
a logic "AND" gate coupled to receive respective outputs from the first and second comparators and connected to switchingly connect a control switch to either a first switch terminal or a second switch terminal depending on the value of the signal indicative of vehicle torque demand relative to the threshold torque range; and
an actuator, wherein
during conditions when the signal indicative of vehicle torque demand is within the threshold torque range, the actuator is configured to generate a signal configured to activate the electric traction motor to drivingly propel the vehicle while de-engaging the internal combustion engine from propelling the vehicle; and
during conditions when the signal indicative of vehicle torque demand is outside the threshold torque range, the actuator is configured to generate a signal configured to deactivate the electric traction motor from drivingly propelling the vehicle while re-engaging the internal combustion engine to propel the vehicle.

41. The control system of claim 40, wherein the upper and lower limits of the threshold torque range are adjusted depending on a specific propulsion equipment being utilized.

42. The control system of claim 40, wherein the upper and lower limits of the threshold torque range are adjusted depending on vehicle use location.

43. The control system of claim 40, wherein the upper and lower limits of the threshold torque range are adjusted

*depending on one or more of: vehicle operational parameters and vehicle operational conditions.*

*44. The control system of claim 43, wherein said operational parameters and operational conditions include one or more of: a state of charge of an energy source of the traction motor, ambient temperature, and barometric pressure.*

*45. The control system of claim 40, wherein the upper and lower limits of the threshold torque range are adjusted depending on an analysis of historical data indicative of previous propulsion system performance of the vehicle.*

*46. The control system of claim 45, further comprising a fuzzy logic learning device coupled to the processor and configured to process the historical data and determine whether the factory-loaded upper limit value of the threshold torque range should be raised or lowered for the vehicle.*

*47. The control system of claim 45, further comprising a neural network device coupled to the processor and configured to process the historical data and determine whether the factory-loaded upper limit value of the threshold torque range should be raised or lowered for the vehicle.*

*48. The control system of claim 40, wherein the processor is further configured to issue a disable command to the traction motor and provide smooth transitioning to the internal combustion engine, in the event the state of charge of an energy source of the traction motor is below a state-of-charge threshold value.*

\* \* \* \* \*